United States Patent [19]
Kurtz et al.

[11] Patent Number: 5,182,735
[45] Date of Patent: Jan. 26, 1993

[54] MAGNETO-OPTIC READOUT APPARATUS USING POLARIZATION SWITCHING OF READOUT BEAM

[75] Inventors: Clark N. Kurtz, Canandaigua; Joseph J. Miceli, Jr., Macedon, both of N.Y.

[73] Assignee: Eastman Kodak Company, Rochester, N.Y.

[21] Appl. No.: 319,031

[22] Filed: Mar. 6, 1989

[51] Int. Cl.$^5$ ............................. G11B 11/00; G11B 13/04
[52] U.S. Cl. .................................... 369/13; 360/59; 360/114; 365/122
[58] Field of Search ................ 369/13, 109, 110, 116, 369/121, 122; 360/114, 59; 365/122; 372/27

[56] References Cited
U.S. PATENT DOCUMENTS

| | | | |
|---|---|---|---|
| 4,410,277 | 10/1983 | Yamamoto | 360/114 X |
| 4,571,650 | 2/1986 | Ojima et al. | 360/114 |
| 4,637,026 | 1/1987 | Liu | 372/27 X |
| 4,955,006 | 9/1990 | Fukushima et al. | 360/59 X |
| 4,959,821 | 9/1990 | Morimoto | 369/13 |

Primary Examiner—Robert S. Tupper
Assistant Examiner—Joseph A. Rhoa
Attorney, Agent, or Firm—Warren W. Kurz; William W. Holloway

[57] ABSTRACT

A magneto-optic playback apparatus which plays back information from a recording layer (RL) which exhibits different light absorption of left and right circular polarized beams emitted from a laser (L). The laser (L) operates in two different polarization modes, DE and TM. Polarization converter (PC) converts linear polarized radiation from the laser in one plane to one circular polarization orientation (left or right) in one direction of transmission, and then converts the opposite circular polarized radiation orientation back to linear polarization in the other direction of transmission. The laser switches between modes according to the magnetic orientation of the medium which is determined by the reflected light. Loss control element (LC) selectively increases the TE losses in the extended laser cavity. The self-coupling laser's operation in either the TE or TM mode depends on the differential absorption by the media of right (RCP) or left (LCP) handed circularly polarized beams.

8 Claims, 2 Drawing Sheets

MAGNETO-OPTIC READOUT APPARATUS USING POLARIZATION SWITCHING OF READOUT BEAM

BACKGROUND OF THE INVENTION

This invention relates to the field of magneto-optic recording. More particularly, it relates to improvements in methods and apparatus for optically reading magnetic information prerecorded on a magneto-optic recording element.

The method of optically reading magnetic information by use of the magneto-optic Kerr (or Faraday) effect is well known. Such method basically comprises the steps of scan irradiating a previously recorded magneto-optic media with linearly polarized radiation (e.g. emanating from a diode laser), and detecting small clockwise or counter-clockwise rotations, usually on the order of 1° or less, in the plane of polarization of the reflected (or transmitted) beam. The direction of such rotation is determined by the vertical orientation (either up or down) of the irradiated magnetic domains representing the recorded information. If the linearly polarized radiation impinging on the disk is regarded as comprising the combination of two in-phase components, a left-hand circularly polarized (LCP) component and a right-hand circularly polarized (RCP) component, then the resulting Kerr rotation of the linearly polarized incident beam is understood as being caused by the media-induced difference in phase retardation between the LCP and RCP components.

As noted above, the amount of Kerr rotation produced by the magneto-optic media is relatively small (i.e. about ±1°); as a result, the depth of modulation of the detector's output signal is correspondingly small. Various schemes have been proposed heretofore to enhance the signal-to-noise ratio (SNR) of the readout signal. One such scheme is disclosed in U.S. Pat. No. 4,571,650 issued in the names of Ojima et al.

Ojima et al. propose exploiting the so-called "self-coupling" effect between a readout laser beam and the magneto-optic media to control the instantaneous polarization mode, TE or TM, in which the laser operates. They note that the polarization mode of the laser can be switched between transverse electric (TE) and transverse magnetic (TM) modes by controlling the plane of polarization of the beam reflected by the media and returned to the laser medium. Ojima et al. propose using a Faraday rotator to set the plane of polarization of the reflected read beam at a certain critical angle (about which the TE/TM mode switching occurs) and using the small, plus or minus Kerr rotation angles produced by the recorded data to cause the laser to switch between its TE and TM modes. Being 90° apart, the different polarization modes are readily distinguishable, making detection of the recorded information correspondingly simple.

While the idea of using the above "self-coupling" effect to detect oppositely oriented magnetic domains in a recording media is meritorious, the proposed implementation of this concept appears to be problematic. Because of the small Kerr rotation angles, very precise alignment of the Faraday rotator is required. Misalignment by 1° would totally eliminate the effect on which the detection scheme is based. Moreover, since the critical angle (67.5° in the disclosed embodiment) will vary from laser to laser, and may even change with usage and age, this detection scheme is not well-suited for use in a consumer product.

SUMMARY OF THE INVENTION

An object of this invention is to provide an improved magneto-optic readout apparatus and method of the type which exploit the aforementioned "self-coupling" effect between readout laser and media, an apparatus and method which are improved from the standpoint that the laser's operation in either the TE or TM mode depends on the differential absorption by the recorded media of right-hand and left-hand circularly polarized radiation, rather than on media-produced angular changes in the plane of polarization of incident linearly polarized radiation.

Unlike the aforementioned prior art approach which utilizes the media-produced, angular change in the plane of polarization of the read beam to switch polarization modes, the present invention makes use of the little-recognized fact that the oppositely oriented magnetic domains in a vertically magnetized magneto-optic film will differentially absorb circularly polarized radiation. Thus, the method of the invention is characterized by the steps of a) converting any TE and TM linearly polarized radiation produced by a laser operating in a state of polarization instability to left-hand circularly polarized (LCP) radiation and right-hand circularly polarized (RCP) radiation, respectively, b) scan irradiating a pre-recorded magneto-optic recording element with a beam of the converted circularly polarized radiation, thereby causing the circularly polarized beam to suffer loss in accordance with it's state of circular polarization and the prerecorded information, c) converting the loss-modified beam substantially back to it's original state of linear polarization, and d) coupling the reconverted beam back into the laser cavity, so that the loss-modulation produced by the prerecorded information controls the state of polarization of the laser. Preferably, any tendency for the laser to operate preferentially in either the TE or TM modes is minimized by selectively controlling the optical losses in the laser cavity so that they are substantially equal for TE and TM, making the laser essentially polarization unstable.

The apparatus of the invention includes a polarization converting means for converting the linearly-polarized output of a laser to circularly polarized radiation, and for reconverting such radiation, after interaction with the recording media, to linearly-polarized radiation in substantially the same plane as that which it had upon exiting the internal laser cavity. Such polarization converter means preferably comprise the combination of a Faraday rotator and a quarter-wave plate.

The invention and its advantages will become more apparent to those skilled in the art from the ensuing detailed description of a preferred embodiment, reference being made to the accompanying drawings.

DETAILED DESCRIPTION OF PREFERRED EMBODIMENTS

Figure 1:
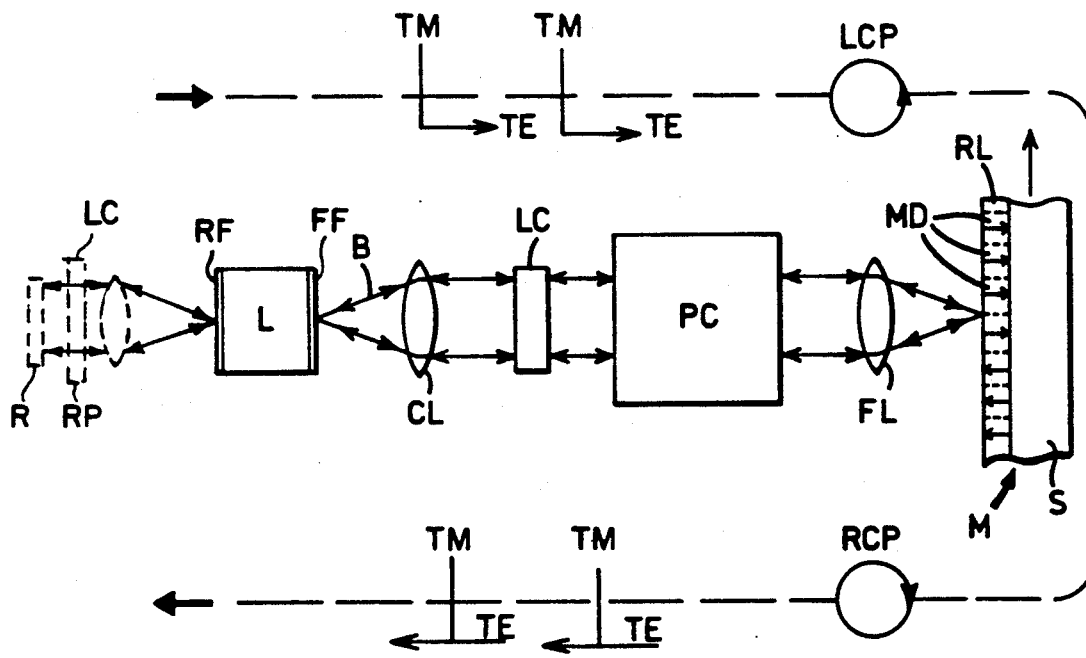
FIG. 1 is a schematic illustration of a portion of a magneto-optic playback system embodying the invention.

As indicated above, this invention is based on the observation that a uniformly magnetized magneto-optic film exhibits differential absorption coefficients for right- and left-hand circularly polarized light; that is, it may exhibit a higher absorption coefficient for, say, RCP than it will for LCP. By symmetry, if the direction of magnetization is reversed, then the absorption coefficients are interchanged. This phenomena, which is known as magnetic-circular dichroism (MCD), has been reported by P. S. Pershan, in an article entitled "Magneto-Optical Effects," Journal of Applied Physics, Vol. 38, No. 3, pp. 1482-90, March 1967; and by M. J. Freiser in "A Survey of Magnetooptic Effects," IEEE Transactions on Magnetic, Vol. Mag-4, No. 2, June 1968. Thus, depending on the orientation direction (up or down) of an irradiated magnetic domain in a magneto-optic recording element, a circularly polarized irradiating beam will be reflected (or absorbed) more or less. While this media-produced difference in reflected beam intensity is relatively small, being about 1% for a terbium-iron-cobalt film, it is sufficient, as explained below, to cause TE/TM switching in the laser cavity. Suitable magneto-optic recording elements are disclosed, e.g., in the commonly assigned U.S. Pat. No. 4,719,154 issued to T. K. Hatwar.

According to the method of the invention, a linearly-polarized beam of radiation, such as emitted by a diode laser, is converted to circularly polarized radiation, either RCP or LCP, prior to being used to playback information recorded in a magneto-optic film. Upon being reflected from such film, the circularly polarized beam is reconverted to linearly-polarized radiation having a polarization plane which is substantially the same as, and preferably identical to, the initial plane of polarization. Depending on the vertical orientation of the magnetic domains of the film, the circularly polarized radiation will be reflected (or absorbed) more or less by the film, due to the above-mentioned MCD of the magneto-optic film. The result is that the reconverted, linearly-polarized radiation will have suffered loss as a function of the recorded information. This loss-modulated beam is then fed back to the laser cavity to control TE/TM switching.

In order to effectively control TE/TM switching by the relatively small difference in beam losses caused by the MCD effect, it will be appreciated that the laser must be operating in (or nearly in) a state of polarization instability. That is, ideally, the laser should be equally capable of generating both TE and TM polarizations, a condition tantamount to its internal losses for TE and TM being equal. In such a case the added differential loss caused by the magnetized film will be sufficient to cause the laser to operate in either the TE mode, or the TM mode, depending on which mode has the lower losses.

Since conventional semiconductor lasers generally have built-in losses which are substantially greater for TM than TE, they normally generate TE polarized light. Thus, such conventional lasers are not optimally suited for use in the present invention without modification. Ideally, it is desirable for the laser to be constructed so that it's losses for TE and TM are substantially equal. Since the TE and TM losses of a laser are influenced differently by the respective reflectances of the laser's front and rear facets, one method of making such lasers is to employ suitable anti-reflection coatings on one or both facets, such coatings being designed to provide reflectances which result in equal TE and TM losses. Alternatively, since the differential Fresnel losses for the TE and TM modes of a conventional laser diode are determined by the symmetry of the laser waveguide, another preferred method for balancing the cavity TE and TM losses can be accomplished by optimizing the waveguide transverse geometry. By more careful design of the laser waveguide cavity, a balance of round trip TE and TM losses is achievable. Such lasers, properly designed, would be equally capable of generating either TE or TM polarizations, and would be useful with the present invention.

Alternatively, to use conventional lasers (for which the internal losses are not equal, and for which the TM losses are normally greater, causing them to generate TE polarized light) in the present invention, additional loss can be provided for the TE polarization by introducing a loss-control element in the external portion of the laser cavity, such as, for example, between the laser and the magneto-optic film. The loss-control element is designed so that its TE losses, by virtue of coupling back to the laser cavity, combine with the internal TE losses of the laser. The purpose of such a loss-control element is to provide an adjustable loss that results in the combined internal losses and losses caused by the loss control element to be equal for TE and TM.

Apparatus for implementing the above method of the invention is illustrated in FIG. 1. As shown, a beam B of linearly-polarized radiation emitted by a laser L is collimated by lens CL and passed through a loss-control element LC. Note, the state of polarization of the beam as it passes through the different optical elements is shown directly above and below the beam as it first passes in one direction through such elements, and then in the opposite direction. The loss-control element, as noted above, functions to selectively increase the TE losses in the extended laser cavity (as defined, in part, by the media) so that the laser, upon receiving reflected radiation from the media, is substantially equally likely to lase in either the TE or TM modes. As shown in the polarization illustrations above and below the beam, the plane of polarization of beam B, in this example, in the TE direction, is not altered by the loss control element. The linearly-polarized radiation emerging from the loss-control element is then passed through a polarization converter PC (described below) which serves to convert the incident beam to circularly polarized radiation which, in FIG. 1, is shown as LCP. Upon reflecting from the magneto-optic recording layer RL of the recording media M, the LCP is converted to RCP and, upon passing back through the polarization converter, the RCP beam is again linearly-polarized. Important to note is that the plane of polarization is still the same (i.e., TE) as the beam had when it exited the laser; otherwise, the losses suffered by the LCP (RCP) beam will not be coupled to the internal losses for the TE (TM) modes, and the polarization mode will not be controlled by the media-produced losses. Preferably, the front facet FF of the laser has a low loss anti-reflection coating to enhance optical feedback into the laser, thus giving more effect of the "external" contributions to the losses. Obviously, if the initial state of polarization of beam B were TM, it would be converted to RCP by the polarization converter, to LCP by the media, and finally back to TM by the polarization converter.

One technique for adjusting the extended laser cavity for equal laser TE and TM losses, i.e., so that it is polarization unstable, is to replace the magneto-optic film with a reflector that has a reflectance approximately equal to the average reflectance of the magneto-optic film. Then, the loss control element is adjusted until the TE losses equal the TM losses, which will result in both TE and TM polarization being generated. Then, when the prerecorded magneto-optic film is put back in the system, we can understand the present invention as follows.

Assume now that briefly the "polarization-unstable" laser randomly generates a beam of TE polarization, i.e. a beam polarized in a direction parallel to the planar junction of a diode laser. This plane polarization is converted by the polarization converter to LCP, and suffers a loss L and conversion to RCP upon reflection from the magnetized film. After passing back through the optical system, the RCP beam is converted back to TE polarization by the optical system, and loss L combines with the internal TE losses of the laser.

If instead, however, the "polarization-unstable" laser briefly generates a TM polarized output, it is converted to RCP by the polarization converter, and suffers loss R and conversion to LCP upon reflection from the magnetized film. Passing back through the optical system, the LCP is converted back to TM, and loss R combines with the internal TM losses of the laser.

Since losses R and L are unequal (say, e.g., L represents a greater loss), then the net losses for the above propositions will be less for the TM polarization, and according to the present invention, the output of the laser will be TM.

Similarly, it follows that if the orientation direction (up/down) of the irradiated magnetic domains MD is reversed in the above examples, loss R will then represent the greater loss, and according to the present invention, the output of the laser will switch to TE.

Thus, this invention allows for the laser to generate TE or TM polarization in accordance with the direction of magnetization of the film. As a disk containing information in the form of vertical magnetization direction spins through the laser beam, the laser light polarization switches between TE and TM according to the data. A large signal is generated, and detection by a variety of techniques is possible.

While the coupling of the losses L and R to the internal TE and TM losses of the laser in such a way as to control the laser polarization is a new concept at the heart of the present invention, another important aspect of the invention is the unique polarization converter PC that provides the conversion from linear-to-circular and back to the same linear polarization after reflection and passing back through the same optical system.

Figure 2:
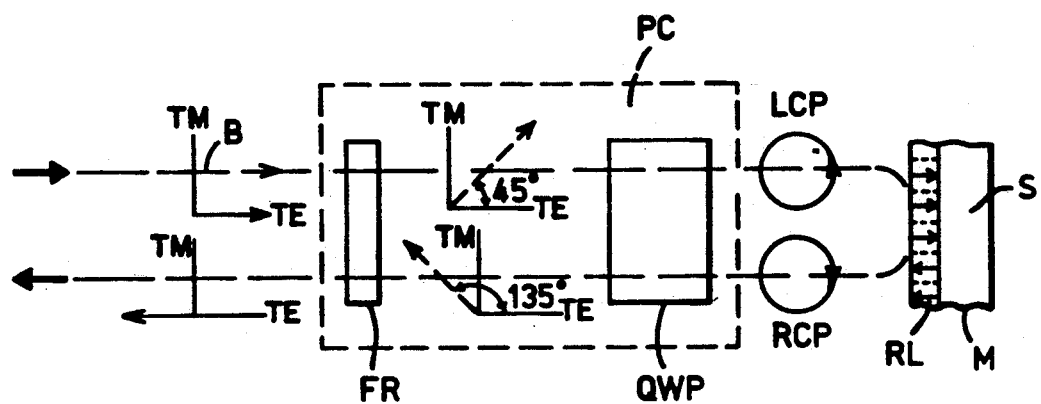
FIG. 2 schematically illustrates a preferred polarization controller used in the FIG. 1 apparatus.

Referring to FIG. 2, a preferred form of polarization converter PC comprises a Faraday rotator FR, preferably set to provide a 45° rotation of the linearly polarized light passing through it, and a quarter-wave plate QWP. In operation, TE polarization is thus rotated to an angle of 45° by the Faraday rotator. The quarter-wave plate serves to convert the light to LCP, and after reflection from the magneto-optic film (which converts it to RCP) the light passes back through the quarter-wave plate and is reconverted to linear polarization at an angle of 135°. Finally it passes back through the Faraday rotator which, because it is a non-reciprocal optical element, rotates the plane of polarization 45 more degrees in the same direction it rotated on the first pass. Consequently, the polarization is converted back to TE. A similar tracking-through of the polarization shows that the polarization converter will take TM polarization and convert it to RCP and back to TM as required.

The Faraday element clearly plays a key role in allowing the polarization converter to work, and it does so by adding a net 90° rotation from a double pass of light (45° from a single pass). The present invention would still be operable, although not so optimally, over a range of Faraday rotations, so long as TE outputs from the laser are converted back to have a larger TE component than a TM one upon return to the laser, and similarly for TM outputs.

This requires that the Faraday rotator have a rotation angle between 22.5° and 67.5°, the closer to 45°, the better. If Faraday rotators with low enough absorption are available, there are a multiplicity of other "optimum" rotation angles that, in effect, add multiples of 180° to the net rotation. These optimum angles are given by:

Optimum Faraday angle $= (m \times 90) - 45$ degrees,

Where m is an integer, and m=1 corresponds to the case we have just described. While the above equation gives the "optimum" Faraday angles, a similar operable range about those angles exists and can be delineated using the same criteria used for the case m=1.

For compactness, it is desirable that the Faraday rotator be a thin film having low losses at the wavelength of the laser. Such films have been described in technical literature.

Various means can be used for the loss control element. All that is required is that it be able to increase the losses for the TM polarization enough more than for the TE polarization, so that the total TM and TE losses become approximately equal. Of course, it is important in so doing that the total losses do not become so large that the laser gain cannot overcome them; otherwise lasing will not occur at all. The loss control element may comprise, for example, a rotatable polarizer RP placed between the rear laser facet RF and a reflector R, in the optical-feedback geometry shown in phantom in FIG. 1. The angle of the polarizer with respect to the TE and TM axes determines the amount of loss it adds to the TE and TM polarizations. It can be rotated to whatever angle necessary for the losses to be equal.

Another way of selectively increasing the TE losses relative to the TM losses is to place, for example, a glass plate in the optical path between the laser L and the polarization converter (as shown in solid lines in FIG. 1) and to tilt the glass plate so that the Brewster angle is satisfied for the TM polarization. This arrangement will tend to reflect more TE than TM light and so will tend to make the losses more equal. The glass plate may be placed at various angles to adjust the losses, and it may have appropriate coatings applied to help.

Optical filters can also be used which have different transmission for TE and TM. Some such filters have an angle sensitivity that help in their adjustment. An important feature of this invention is to allow for the adjustability of the loss control element, a factor that is important in situations where a laser may need to be replaced, and the new laser may not have exactly the same parameters as the laser it replaced.

Another approach to TE/TM loss control is to deposit directly on the facet of the laser a coating designed to cause the laser to have equal TE and TM losses. This possibility exists because the difference in Fresnel reflection of the laser facet to TE and TM light is, in fact, one of the primary loss differences in the laser, and is largely responsible for the TM losses dominating the TE losses in diode lasers in the first place.

All of these methods can equally be used in a feedback configuration at the back facet of the laser to control losses.

Figure 3:
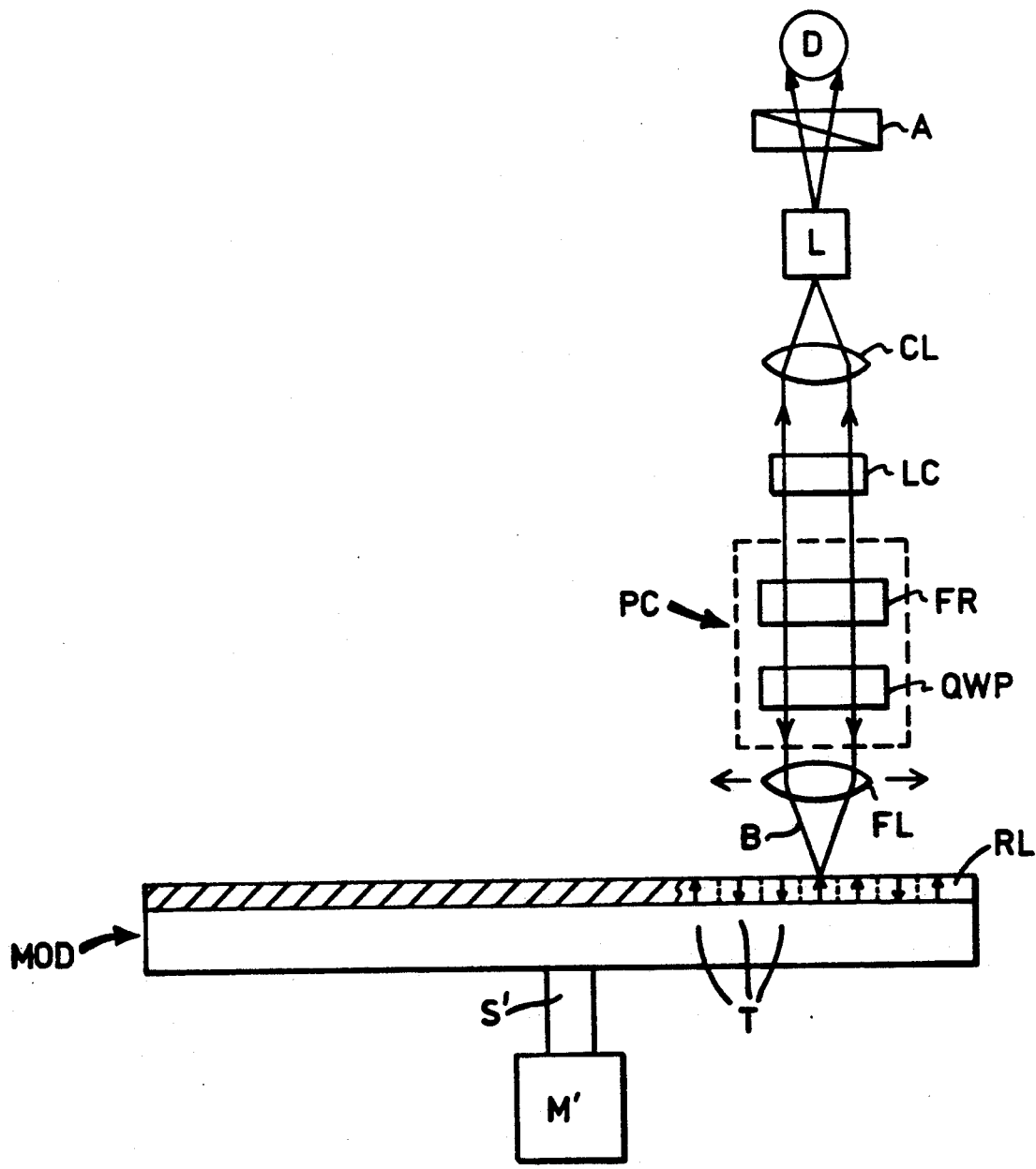
FIG. 3 schematically illustrates a preferred magneto-optic playback system.

FIG. 3 schematically illustrates a magneto-optic playback system embodying the invention. As shown, a magneto-optic disk MOD is rotated on a spindle S' driven by a spindle motor M'. The disk comprises a rigid substrate S which supports a magneto-optic recording layer RL. The recording layer is prerecorded with information in the form of oppositely oriented magnetic domains MD which are arranged along concentric circular tracks T. As the disk rotates, the individual magnetic domains along a given track are sequentially irradiated by the beam B of circularly polarized radiation provided by the apparatus described above. Depending on the orientation (up/down) of the magnetic domains, the loss of the circularly polarized beam reflected by the recording layer is modulated. As explained above, the laser L emits TE or TM depending on the orientation of the domains. The mode in which the laser operates is determined by arranging, for example, a polarization analyzer A in the beam exiting the laser's rear facet. The axis of the analyzer is aligned with either the TE or TM directions so that the detector D detects radiation in only one of the two polarization modes. Alternatively, of course, a conventional differential detection scheme could be used to detect the polarization switching in the laser cavity.

The invention has been described in detail with particular reference to certain preferred embodiments thereof, but it will be understood that variations and modifications can be effected within the spirit and scope of the invention.

We claim:

1. A magneto-optic playback apparatus for playing back information recorded in a magnetic recording layer of a magneto-optic recording element, such information being recorded in the form of vertically magnetized magnetic domains of opposite orientation, such recording layer being of the type which exhibits a differential absorption of left- and right-hand circularly polarized radiation, depending upon the orientation of the magnetic domains irradiated by such incident radiation, said apparatus including a laser adapted to operate in two different modes to produce two different linearly-polarized beams of radiation, the plane of polarization of one beam mode being perpendicular to the plane of polarization of the other beam mode, said laser being arranged to direct both of said beam modes along an optical path toward the magnetic recording layer, such recording layer serving to reflect a portion of a beam of radiation travelling along said path back toward the laser; means for scanning the recording layer with both of said beam modes of radiation to irradiate the prerecorded information thereon according to a predetermined procedure; optical means for coupling said laser with the recording layer so that, as said beam scans the recording layer and the recording element reflects such beam back to the laser, said optical means selects in which beam mode the laser operates by the orientation of the magnetic domains irradiated by the beam; and photodetector means for continuously detecting in which of the two modes the laser is operating, wherein said optical means comprises: a) an optical loss control element for controlling losses for said beam modes whereby a probability of operation in either beam mode by the laser is substantially equal for either of said two modes in the absence of any coupling of radiation between the laser and recording layer, and b) a polarization converter arranged in the optical path between the laser and recording layer, said polarization converter functioning to (i) convert an incident beam of linearly polarized radiation to a beam of either left-hand or right-hand circularly polarized radiation depending upon the operating mode of the laser, such beam of circularly polarized radiation striking the recording element and being reflected therefrom, and (ii) reconvert the beam of circularly polarized radiation reflected from the recording element to a beam of linearly polarized radiation having a plane of polarization substantially the same as that of said incident beam.

2. The apparatus as defined by claim 1 wherein said optical loss element comprises a polarizing filter located in the optical cavity of the laser.

3. The apparatus as defined by claim 1 wherein said optical loss element comprises a transparent plate located along said optical path, said plate being arranged to cause greater losses for one polarization mode than the other.

4. The apparatus as defined by claim 1 wherein said optical loss element is adjustable to control the susceptibility of the laser to operate in one mode relative to the other.

5. The apparatus as defined by claim 1 wherein said polarization converter comprises the combination of a Faraday rotator for rotating the plane of polarization of either of said plane-polarized beams by about 45°, and a quarter-wave plate for converting the plane-polarized radiation emerging from the Faraday rotator to circularly polarized radiation.

6. The apparatus as defined by claim 1 wherein said laser has front and rear facets through which said laser emits linearly polarized beams in opposite directions, said recording layer being scan irradiated by a beam passing through said front facet of said laser, and wherein said apparatus further comprises a means for optically coupling a beam of radiation emitted through said rear facet back into said laser, said loss control element being positioned in the optical path between the laser and said optical coupling means.

7. Magneto-optic playback apparatus for playing back information recorded in a magnetic recording layer of a magneto-optic recording element, such information being recorded in the form of vertically magnetized domains of opposite orientations that exhibit different absorption of left and right circular polarized radiation, said playback apparatus including a laser operating in two linear polarization modes whose planes of polarization are perpendicular to each other, said laser having front and rear facets through which said linearly polarized radiation beams may pass externally, one facet arranged to externally project said beam through optical means toward the magnetic recording layer, said recording layer serving to reflect a portion of said beam back through said optical means for coupling into the laser, means for scanning the recording layer with said beam to sequentially irradiate the prerecorded information thereon, said optical means including polarization convertor means for converting linear polarized radiation in one plane to one circular polarization orientation in one direction of transmission, and for converting the opposite circular polarized radiation orientation back to linear polarization in same said plane in the other direction of transmission, said optical means serving to couple each of the two circular polarization states of radiation reflected from the recording layer to one of the linear polarization states of the laser resulting in said laser beam switching between polarization states according to the magnetic orientation of the recorded information domains providing the reflected radiation, and detector means for providing a signal indicating the instantaneous polarization state in which said laser is operating.

8. The apparatus according to claim 7 wherein said polarization converter means comprises a combination of a Faraday rotator for rotating the plane of polarization of said linear polarized radiation by about 45°, and a quarter-wave plate for converting the linearly polarized radiation emerging from the Faraday rotator to circularly polarized radiation.

* * * * *